United States Patent [19]

Hill

[11] Patent Number: 4,872,756
[45] Date of Patent: Oct. 10, 1989

[54] DUAL PATH INTERFEROMETER WITH VARYING DIFFERENCE IN PATH LENGTH

[75] Inventor: Barry R. Hill, St. Helens, England

[73] Assignee: Pilkington Brothers plc, United Kingdom

[21] Appl. No.: 919,860

[22] Filed: Oct. 16, 1986

[30] Foreign Application Priority Data

Oct. 17, 1985 [GB] United Kingdom ................. 8525650

[51] Int. Cl.$^4$ ............................................... G01B 9/02
[52] U.S. Cl. ..................................... 356/361; 356/360
[58] Field of Search ................. 356/345, 360, 361, 346

[56] References Cited

U.S. PATENT DOCUMENTS

| | | | |
|---|---|---|---|
| 3,450,476 | 6/1969 | Rando | 356/361 |
| 4,188,122 | 2/1980 | Massie et al. | 356/360 |
| 4,355,900 | 10/1982 | Nussmeier | |
| 4,406,542 | 9/1983 | Boggy et al. | 356/345 |
| 4,538,910 | 9/1985 | Doyle | |
| 4,654,530 | 3/1987 | Dybwad | 356/346 |

FOREIGN PATENT DOCUMENTS

| | | | |
|---|---|---|---|
| 3112157 | of 0000 | Fed. Rep. of Germany | |
| 1195839 | 11/1966 | United Kingdom | 356/361 |
| 1437119 | 10/1973 | United Kingdom | |
| 1588280 | 3/1978 | United Kingdom | |

OTHER PUBLICATIONS

*Patent Abstracts of Japan*, vol. 3, No. 81 (E-122), Jul. 12, 1979, p. 143 and JP-A-54 59 166, SANYO DENKI K.K., 12-5-79; Abstract.

*Optical Engineering*, vol. 23, No. 3, May–Jun., 1984, pp. 294–297, Bellingham, Washington, U.S.; P. Hariharan et al: "High Precision Digital Interferometry: Its Application to the Production of an Ultrathin Solid Fabry–Perot Etalon".

*Soviet Inventions Illustrated*, Week D29, Aug. 26, 1981, Abtract No. S02 G 7046 D29, Derwent Publications Ltd., London, GB & SU-A-767 508 (EFREMOV YU P).

*Optics Communications*, vol. 45, No. 6, May, 1983, pp. 367–371, Amsterdam, NL; N. J. Burton, et al: "Laser-Controlled Sampling in a Fournier Spectrometer for the Visible and Ultraviolet Using a Phase-Locked Loop".

*Review of Scientific Instruments*, vol. 51, No. 10, Oct., 1980, pp. 1330–1334, New York, US; D. L. Allensworth: "Interferometer for the Determination of Strains Due to Domain Switching in Ferroelectrics".

*Primary Examiner*—Vincent P. McGraw
*Assistant Examiner*—S. A. Turner
*Attorney, Agent, or Firm*—F. Eugene Davis, IV

[57] ABSTRACT

An interferometer is provided for producing an interference pattern from light such as laser light which travels along first and second optical paths and at the end of each such path there is a respective fixed mirror for directing light to a common optical path. Means are provided to vary the optical path length of light in the or each first or second optical path to produce an interference pattern in the common optical path, which means comprises a pair of parallel-plane optical flats in accordance with one embodiment of the invention, which are each rotated in an oscillating manner to produce a linearly varying optical path length during rotation. According to another aspect of the invention first detector means are provided for detecting a reference part of the interference pattern produced to derive therefrom a reference signal, and second detector means are provided for receiving the interference pattern to thereby derive signals indicative of successive parts of the interference pattern. Means are provided for comparing the reference and successive interference pattern signals to derive therefrom signals which indicate the optical path difference corresponding to the interference pattern.

12 Claims, 4 Drawing Sheets

DUAL PATH INTERFEROMETER WITH VARYING DIFFERENCE IN PATH LENGTH

BACKGROUND OF THE INVENTION

This invention relates to interferometry, for example, to interferometry in which the phase of light from the light source is modulated to produce interference fringes.

One known interferometer uses piezoeletric devices to move reference mirrors to provide phase modulation of the light by changing the optical path length and hence produce an interference pattern. Whilst the use of such piezoeletric devices is generally satisfactory for an interferometer working in the visible part of the electromagnetic spectrum, such devices are not generally suitable for covering the infra-red region since the movements required of the mirrors to produce modulation are relatively large as a consequence of the longer wavelength of infra-red radiation, compared to visible radiation.

One possible way of providing for phase modulation in the infra-red region would be to utilize a plane-parallel optical flat such as is identified in U.K. Patent Specification No. 1195839, the disclosure of which is incorporated herein by reference. Although the disclosure does not relate strictly to infra-red phase interferometry, and is concerned with analysing a wide spectrum of panchromatic light, nevertheless it does teach a method whereby oscillating angular rotation of the optical flat varies the optical path length in the interferometer as a consequence of the difference in refractive index between the optical flat and the air through which the light travels inside the interferometer. However, it will be apparent that although this principle could be applied directly to a phase interferometer of known type, the change in apparent optical thickness when the angle of the flat is changed is non-linear and hence cause difficulties in interpreting the characteristics of the resulting interference pattern. This non-linearity is a consequence of the relationship relating the angle ($\theta$) of the optical flat to apparent optical thickness (OT), which is given by the equation:

$$OT = 2T \left[ N \cos\left( \sin^{-1}\left( \frac{\theta}{N} \right) \right) - \cos \theta \right]$$

where:
T = thickness
N = refractive index of the optical flat

If this equation is plotted out it can be seen to be quite non-linear and it is for this reason that UK Patent Specification No. 1195839 also teaches the use of a correlation disc which is secured to the side of the flat for rotation about the axis of rotation of the flat. The correlation disc is provided with appropriate markings, which are spaced apart in a non-linear manner, and a photo-detector is used to read off the markings while the flat is being oscillated. The resulting signals are then processed by a computer to provide a linear reading which can then be used to derive signals corresponding to the interference pattern. The relative complexity of this approach is a disadvantage.

SUMMARY OF THE INVENTION

According to a first aspect of the invention there is provided an interferometer for producing an interference pattern from substantially monochromatic light travelling along respective first and second optical paths, each path having reflection means for returning light components to a common optical path, means to vary the optical path length of light in the or each first and/or second optical path to thereby produce an interference pattern in the common optical path, first detector means for detecting a reference part of the interference pattern produced to derive therefrom a reference signal, second detector means for receiving the interference pattern thereby to derive signals indicative of successive parts of interference pattern, and means for comparing said reference and successive signals to derive therefrom signals indicative of the optical phase difference corresponding to the interference pattern.

The first detector means may be supplied with light from the interference pattern produced on the common optical path by means of a beam splitter, in which case the first detector means may be disposed in an optical path substantially orthogonal to the axis of the common optical path. In such an arrangement the beam splitter may be rotatable such that the interference pattern can selectively be directed onto an imager such as a screen, for example, a ground glass screen; the arrangement affording means whereby the mirrors in the interferometer can be aligned to ensure that the axes of the first and second optical paths coincide at the common optical path. Once such alignment is determined the beam splitter can be rotated back to its original position so that the required reference part of the interference pattern can be directed onto the first detector means.

Conveniently scanning means may be provided for scanning the interference pattern over the second detector means, particularly if the latter comprises a single photo-detector. Alternatively, if the second detector means comprises an array of detectors, each being representative of one particular respective part of the interference pattern, the pattern may be imaged directly onto the array by e.g. an optical element such as a lens.

According to a second aspect of the invention there is provided an interferometer for producing an interference pattern from light travelling along respective first and second optical paths, each path having reflector means for returning light components to a common optical path, light refraction means positioned in said first and second paths and arranged so that angular movement of the refraction means causes substantially linearly changing variations of the path length difference between the first and second paths, and means for oscillating the refraction means so that said path length difference is varied to produce an interference pattern in the common optical path of the interferometer.

Conveniently, the refraction means of the interferometer according to the second aspect of the invention comprises a pair of plane-parallel optical plates, one positioned in the first optical path and the other positioned in the second optical path, the arrangement being such that an increase in angular position of the plate in one path occur simultaneously with a decrease in angular position of the plate in the other path such that non-linearities in each respective path tend to cancel each other out and thus provides a substantially linear variation in optical path length in the interferometer.

As an alternative to the arrangement described in the preceding paragraph, a single plane-parallel optical plate may be provided if the interferometer is arranged such that the first optical path and the second optical path intersect at a given point within each path length, in which case the single optical plate may be disposed at an angle which bisects the optical axes of the first and second optical paths at the point of intersection, the arrangement being such that angular rotation of the plate increases the length of one optical path and correspondingly decreases the length of the other optical path.

BRIEF DESCRIPTION OF THE DRAWINGS

The invention will now be described, by way of example only, with reference to the accompanying drawings in which.

DETAILED DESCRIPTION OF THE DRAWINGS

Figure 1:
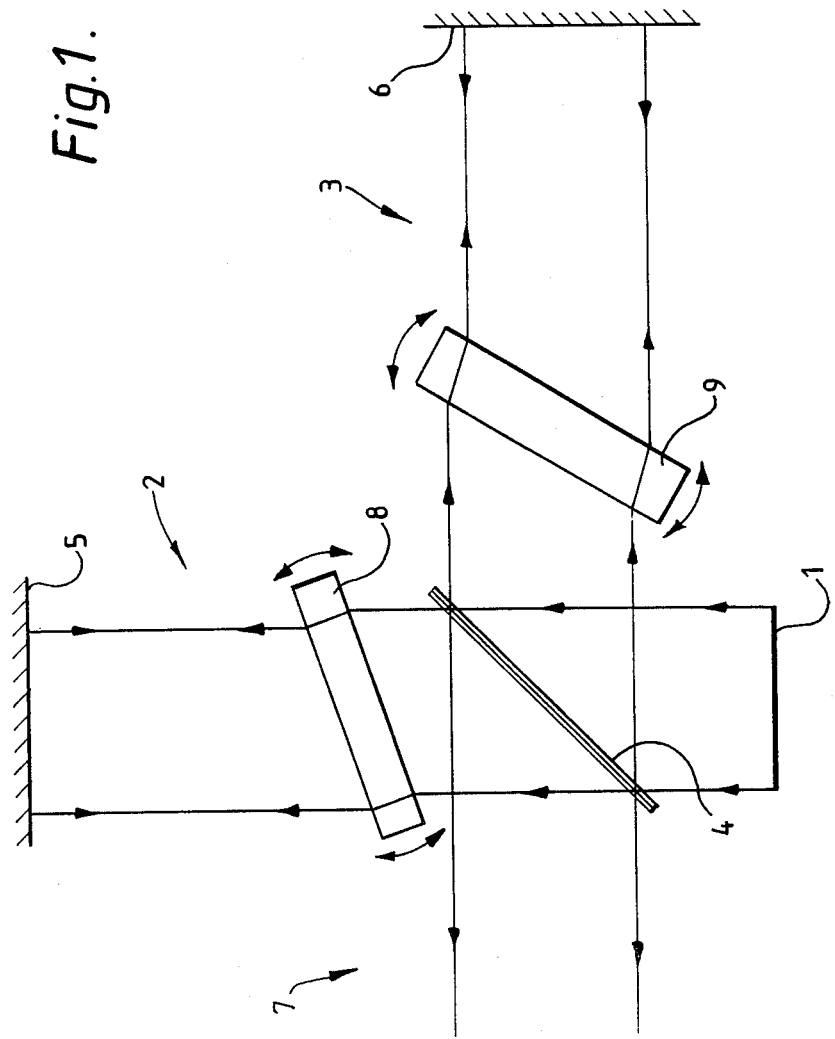
FIG. 1 shows a simplified view of the principle embodying one aspect of the invention.

Referring firstly to FIG. 1, there is shown a simplified view of part of an interferometer in which monochromatic light (shown arrowed) is provided from a light source 1 which is typically a laser light source. The interferometer has a reference arm shown generally at 2 and a sample arm shown generally at 3. A beam splitter 4 is disposed at an angle of 45° to the optical axis of the source 1 and provides light to arms 2 and 3 in a conventional manner.

Each arm 2, 3 has reflecting means in the form of a respective mirror 5, 6 for returning light components from the source 1 to a common optical path shown generally at 7.

The arrangement described thusfar is generally conventional.

Between the mirror 5 of the reference arm 2 and the beamsplitter 4 is disposed an angularly movable plane-parallel optical plate 8, the arrangement being such that an increase in angular movement away from the plane of the mirror 5 correspondingly increases the apparent optical path length of the arm 2. This is a consequence of the difference in refractive index between the plate 8 and the air medium through which the light travels in the remainder of the arm 2.

Similarly, between the mirror 6 of the sample arm 3 and the beamsplitter 4 is disposed an angularly movable plane-parallel optical plate 9, the arrangement being such that an increase in angular movement away from the plane of the mirror 6 also correspondingly increases the apparent optical path length of the arm 3.

In use, a sample to be analysed, for example a piece of optical glass, is placed between the plate 9 and mirror of the sample arm 3. Plates 8 and 9 are oscillated in synchronism such that as the angle of one is increased the angle of the other is decreased during each oscillation. A typical frequency of oscillation is 50 Hz, with a typical plate movement generated of some 2 degrees of arc. Interference fringes are thus set up in the common optical path 7 which change phase linearly and thus make it much easier to analyse and/or construct a resulting interferogram.

Figure 2:
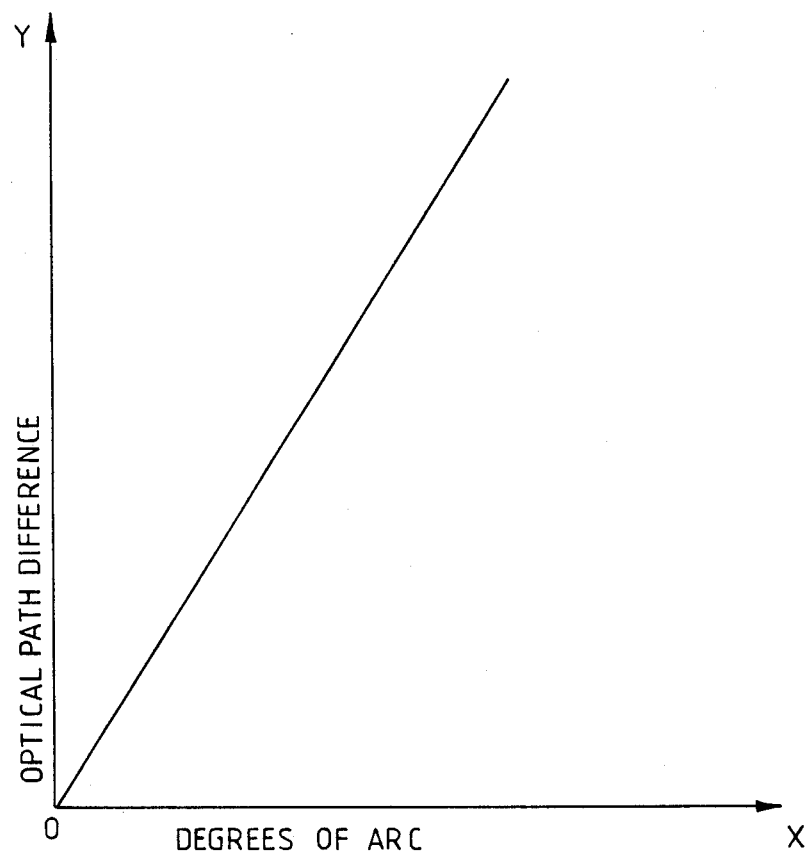
FIG. 2 is a graph of the variation of optical paths shown in FIG. 1.

In FIG. 2 there is shown a plot on an X-Y graph of the combined optical thickness of each arm 2, 3, wherein it will be seen that an extremely linear modulation is produced. The X axis shows increasing angular displacement of the refraction means (in combination) and the Y axis shows the change in optical path length of each arm 2, 3.

Figure 3:
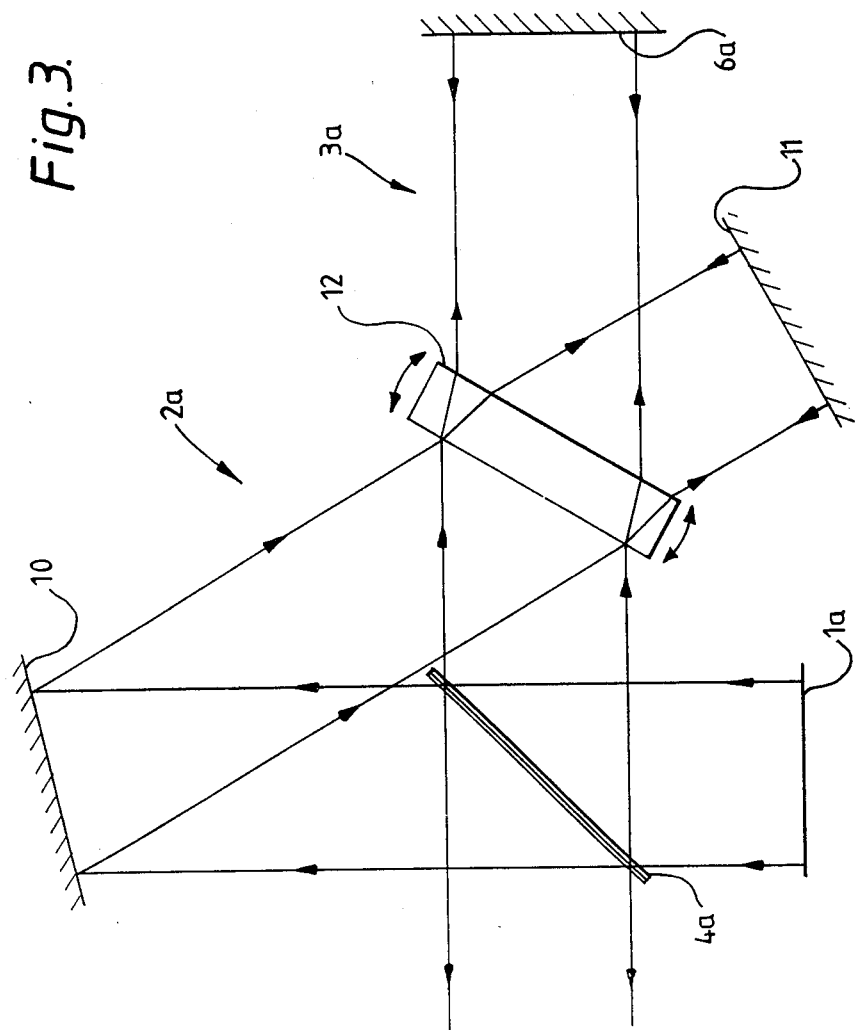
FIG. 3 shows a simplified view of the principle embodying a different arrangement to that of FIG. 1.

Referring now to FIG. 3 there is shown a simplified view of the principle embodying a different arrangement to that of FIG. 1 in which the refraction means is a unitary element. In the drawing the reference arm 2a and the sample 3a are arranged such that the first optical path and the second optical path intersect at a point within each path length. This is achieved by arranged a pair of mirrors 10, 11 in the reference arm, mirror 10 being disposed at an angle to a plane normal to the light source 1a. The second mirror 11 is disposed on the opposite side of the optical path of the sample arm 3a normal to the incident light from the mirror 10 so that such light is reflected back.

Where the first and second optical paths intersect is disposed a single refracting means in the form of a plane-parallel optical plate 12 which bisects the angle of intersection of both of the optical paths. In this arrangement it will be apparent that as both optical paths share the same optical plate 12, an increase in the angle of the plate in one path occurs simultaneously with a decrease in the angle of the plate in the other path. As a result, the non-linearities present in each path tend to cancel each other out, with the result that a substantially linear phase modulation is achieved, as depicted in FIG. 2. However, although such non-linearities are cancelled it will nevertheless be appreciated that the effective difference in path length between each arm is in fact doubled.

Figure 4:
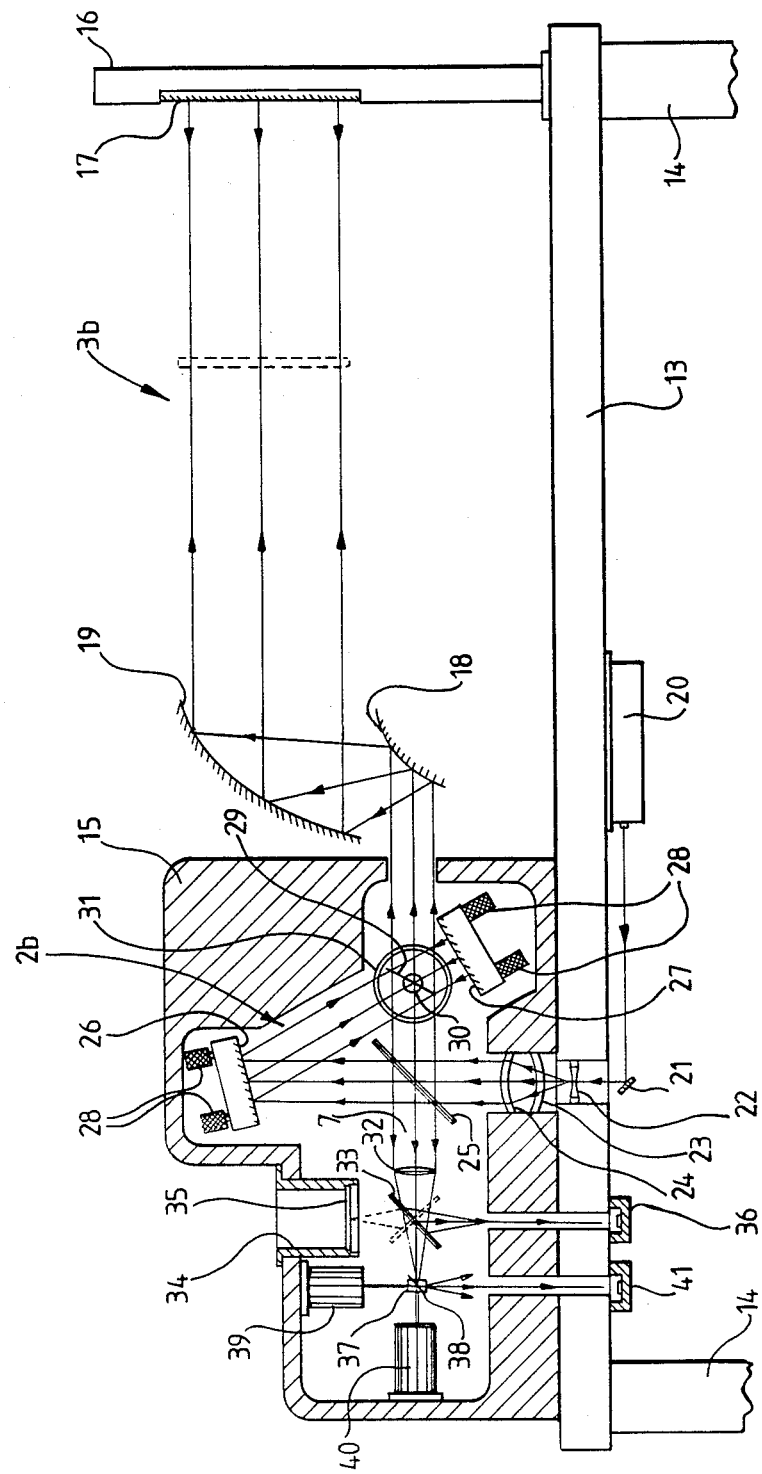
FIG. 4 is a schematic part sectional view of an interferometer utilizing the arrangement of FIG. 3, and showing the principle embodying another aspect of the invention.

In FIG. 4 there is shown a part - sectional view of an interferometer which utilizes the principle outlined and described with reference to FIG. 3. The interferometer comprises a rigid metal table 13 supported on four legs 14 (only 2 of which are shown). On the top surface of table 13 near near to one end is a metal housing 15 within which are disposed various optical elements of the interferometer, to be described subsequently.

At the end of the table 13 remote from the housing 15 is an upright mirror support 16 and a respective mirror 17, which corresponds to mirror 6a shown in FIG. 3. Between the housing 15 and mirror 17 is shown schematically a beam expander of the type known as a Dall-Kirkham beam expander, having a part spherical first reflector 18 and an elipsoidal second reflector 19, the arrangement affording expansion of the light beam, shown arrowed, in the test arm of the interferometer, which arm is shown generally arrowed at 3b.

Fixed underneath the table 13 is a laser 20, the output of which is shown arrowed. The laser 20 is chosen to cover a specified wavelength band and can be replaced or switched as necessary to provide coverage for the visible and infra-red regions of the electro-magnetic spectrum. The beam of laser light is directed towards a mirror 21 which is disposed at an angle of 45° to the table 13 adjacent an aperture therein which contains an optical element 22. Above the element 22 is a corresponding aperture in the housing 15 within which is disposed a pair of optical elements 23, 24. Optical elements 22, 23 and 24 define in combination a beam expander which expands the substantially monochromatic light output from the laser 20 into a light beam of approximately 25 millimetre diameter.

Within the housing 15 above the optical elements 22, 23 and 24 is a beam splitter 25 disposed at an angle of 45° to the plane of the table 13 and arranged to transmit roughly half of the incident light from the laser 20 to a reference arm 2b and reflect the rest to a sample arm 3b of the interferometer.

The reference arm 2b is composed of a pair of movable mirrors 26, 27 which correspond, respectively, to mirrors 10 and 11 referred to and described in FIG. 3. Mirrors 26 and 27 are each provided with a respective pair of knurled nuts 28, rotation of which alters the angle of each mirror 26, 27 with respect to each other and/or the beam splitter 25.

At a position in which the optical paths of the reference arm 2b and sample arm 3b intersect is disposed a refractive element in the form of a plane-parallel optical plate 29, which corresponds to the plate 12 referred to and described with reference to FIG. 3. The optical plate 29 is made from Cleartran and is carried on the end of a spindle 30 of an electric servo motor 31. The plane of the plate 29 generally bisects the angle of intersection between the respective optical paths of the reference arm 2b and the sample arm 3b.

Adjacent the beam splitter 25 in the common optical path 7 is a focusing lens 32 which is used to focus the interference pattern described below.

Within the housing 15 on the side of the beamsplitter 4 remote from the plate 29 is a further beam splitter 33 which is rotatable on a central axis to the position shown in outline. Above the beam splitter 33 is a viewing eyepiece 34 fixed to the upper part of the housing 15. The eye piece 34 has a ground glass viewing screen 35 secured at its lower end in a position corresponding to the focus of the lens 32.

In the lower part of the housing opposite to the position of the eyepiece 34 is an aperture which also extends through the table 13. Aligned with this aperture and fixed to the underside of the table 13 is a photo-detector 36 which in this embodiment defines first detector means according to the invention.

Between the end wall of the housing 15 and the beamsplitter 33 is a scanner which essentially comprises a pair of mirrors 37, 38 each mounted on a respective spindle of a servo motor 39, 40, each of which is disposed orthogonally to the other. This type of scanning means is generally conventional and is adapted to scan a beam in a T.V. type raster of one hundred lines. Below the scanning mirrors 37, 38 is an aperture in the housing 15 and a corresponding aperture in the table 13. Aligned with the aperture and fixed to the underside of the table 13 is a photo-detector 41 which in this embodiment defines second detector means according to the invention.

In operation, a sample to be analysed, shown in outline, is placed in the sample arm 3b. The monochromatic light from the laser source 20 is reflected off mirror 21 and is expanded by the expander optical elements 22, 23 and 24. The expanded beam is then split into two roughly equal parts by the beam splitter 25, one beam being directed into the reference arm 2b and the other being directed into the sample arm 3b. Angular oscillation of the plate 29 by the servo-motor 31 varies the apparent optical length of each respective arm 2b, 3b and hence modulates the phase of the interference pattern which is created when the two beams are re-combined on a common optical path between beam splitters 25 and 33.

In the position of the beam splitter 33 shown in solid line, part of the resulting interference pattern is split-off and directed towards the first detector 36. This is used to derive a reference signal corresponding to a reference part of a subsequently constructed interferogram. That part of the beam which is not split-off by the beam splitter 33 is focussed onto the scanner mirrors 37, 38 by the lens 32 and sequentially scanned over the second detector 41. The signals produced by the detector over the period of one complete scan of the interference pattern are compared with the reference signal at any given instant and the resulting signals are then processed to construct an abberation map of the sample being tested. By changing the amplitude of the electrical signal used to drive the motor 31 and hence the optical refraction plate 29 the change in optical path difference per scan line can be altered to correspondingly alter the resolution of the abberation map. Thus, by changing the amptitude of oscillation of plate 29 the same number of phase changes per scan for different wavelengths of light, including infra-red, can be achieved.

The processing of the signals from the interferometer also takes account of a doppler-type error which is introduced as a result of the movement, clockwise or anti-clockwise, of the scanner mirrors 37 and 38. The error produced is proportional to the number of fringes and the scan speed, which is the same as the rate of change of phase. Since the rate of change of phase is known from the data collected during processing of the signals, an appropriate error correction term can be introduced.

The provision of the eyepiece 34 and screen 35 is useful in first setting up the interferometer since when the beam splitter 33 is rotated to the position shown in outline the interference pattern becomes focussed as a single point on the screen 35. If two points are revealed on the screen 35 it indicates that adjustment is necessary to the optical elements of the interferometer, usually an adjustment of mirror 17 in the sample arm 3b. When working in the infra-red the screen 35 may be provided with a phosphor coating to render the focussed beam visible to the naked eye. Alternatively, the screen may be dispensed with and e.g. a simple aperture may be provided instead at the focal point of the lens 32 in the eyepiece 33, where a photo-detector may be used to indicate correct alignment of the optical elements in the system.

Preferably, the optical elements of the interferometer are all made from materials such as Cleartran which work in both the visible and infra-red region of the electro-magnetic spectrum.

It will be apparent from the above that the only changes required of the interferometer in order to cover visible and infra-red light are to switch in a different laser and second detector and change the gain to the signal driving the plate 29 in order to achieve the correct number of phase changes for a given wavelength.

It will be understood that the term "light" used herein is intended to cover visible and invisible parts of the electro-magnetic spectrum.

What is claimed is:

1. An interferometer for producing an interference pattern from substantially monochromatic light travelling along respective first and second optical paths, each path having reflection means for returning light components to a common optical path, means to vary the difference between the first and second optical paths to thereby produce an interference pattern in the common optical path, first detector means for detecting a reference part of the interference pattern produced to derive therefrom a reference signal, second detector means for receiving the interference pattern thereby to derive signals indicative of successive parts of said interference pattern, and means for comparing said reference and successive signals to derive therefrom signals indicative of the optical phase difference corresponding to the interference pattern.

2. Apparatus according to claim 1 in which the first detector means is supplied with light from the interference pattern produced on the common optical path by means of a beam-splitter.

3. Apparatus according to claim 2 in which the first detector means is disposed in an optical path substantially orthogonal to the axis of the common optical path.

4. Apparatus according to claim 2 and an imager, said beam-splitter being rotatable between two positions such that said interference pattern can selectively be directed into said imager or onto said first detector; the arrangement affording means whereby the alignment of the interferometer can be observed to ensure that the axes of said first and second optical paths coincide at the common optical path.

5. Apparatus according to claim 1 further including scanning means for scanning the interference pattern over the second detector means.

6. Apparatus according to claim 1 in which the second detector means comprises an array of detectors, each being representative of one particular respective part of the interference pattern, and the pattern is imaged directly onto the array.

7. Apparatus according to claim 6 in which the interference pattern is imaged directly onto the array by an optical element such as a lens.

8. An interferometer for producing an interference pattern from substantially monochromatic light travelling along respective first and second optical paths, each path having reflector means for returning light components to a common optical path, light refraction means positioned in said first and second paths and arranged so that angular movement of the refraction means causes substantially linearly changing variations of the path length difference between the first and second paths, and means for oscillating the refraction means so that said path length difference is varied to produce an interference pattern in the common optical path in the interferometer.

9. Apparatus according to claim 8 in which the refraction means of the interferometer comprises a pair of plane parallel optical plates, one positioned in the first optical path and the other positioned in the second optical path, the arrangement being such that an increase in angular position in one path occurs simultaneously with a decrease in angular position in the other path such that non-linearities in each respective path tend to cancel each other out and thus provide a substantially linear variation in optical path length in the interferometer.

10. Apparatus according to claim 8 in which the interferometer is arranged such that the first optical path and the second optical path intersect at a given point within each path length and a single plane optical plate is provided, the arrangement being such that angular rotation of the plate increases the length of one optical path and correspondingly decreases the length of the other optical path.

11. Apparatus according to claim 10 in which the single optical plate is disposed at an angle which bisects the optical axes of the first and second optical paths at the point of intersection.

12. An interferometer for producing an interference pattern from substantially monochromatic light travelling along respective first and second optical paths, each path having reflector means for returning light components to a common optical path, light refraction means positioned in said first and second paths and arranged so that angular movement of the refraction means causes substantially linearly changing variations of the path length difference between the first and second paths, means for oscillating the refraction means so that said path length difference is varied to produce an interference pattern in the common optical path in the interferometer, scanning means in the common optical path for scanning light in the common optical path in a raster pattern, and detector means placed to receive light from the scanner thereby to produce an electrical signal representative of the successive parts of the interference pattern.

* * * * *